US011568301B1

(12) United States Patent
Yueh et al.

(10) Patent No.: US 11,568,301 B1
(45) Date of Patent: Jan. 31, 2023

(54) CONTEXT-AWARE MACHINE LEARNING SYSTEM

(71) Applicant: Trend Micro Incorporated, Tokyo (JP)

(72) Inventors: Peng-Yuan Yueh, Taipei (TW); Chia-Yen Chang, Taipei (TW); Po-I Wang, Taipei (TW); Te-Ching Chen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1403 days.

(21) Appl. No.: 15/884,660

(22) Filed: Jan. 31, 2018

(51) Int. Cl.
 *G06N 20/00* (2019.01)
 *H04L 9/40* (2022.01)

(52) U.S. Cl.
 CPC .......... *G06N 20/00* (2019.01); *H04L 63/145* (2013.01)

(58) Field of Classification Search
 CPC ...................................................... G06N 20/00
 See application file for complete search history.

(56) References Cited

U.S. PATENT DOCUMENTS

| 8,935,788 B1* | 1/2015 | Diao ..................... G06F 21/564 726/24 |
| 10,362,057 B1* | 7/2019 | Wu ..................... H04L 63/1408 |
| 2017/0132528 A1* | 5/2017 | Aslan ..................... G06N 20/00 |

OTHER PUBLICATIONS

Wang, T. Y., Wu, C. H., & Hsieh, C. C. (Aug. 2009). Detecting unknown malicious executables using portable executable headers. In 2009 Fifth International Joint Conference on INC, IMS and IDC (pp. 278-284). IEEE. (Year: 2009).*
Ding, J., Jin, J., Bouvry, P., Hu, Y., & Guan, H. (May 2009). Behavior-based proactive detection of unknown malicious codes. In 2009 Fourth International Conference on Internet Monitoring and Protection (pp. 72-77). IEEE. (Year: 2009).*
Shazeer, N., Mirhoseini, A., Maziarz, K., Davis, A., Le, Q., Hinton, G., & Dean, J. (2017). Outrageously large neural networks: The sparsely-gated mixture-of-experts layer. arXiv preprint arXiv:1701. 06538. (Year: 2017).*
Vinayakumar, R., Soman, K. P., & Poornachandran, P. (Sep. 2017). Applying convolutional neural network for network intrusion detection. In 2017 International Conference on Advances in Computing, Communications and Informatics (ICACCI) (pp. 1222-1228). IEEE. (Year: 2017).*

* cited by examiner

*Primary Examiner* — Brian M Smith
*Assistant Examiner* — Lokesha G Patel
(74) *Attorney, Agent, or Firm* — Beyer Law Group LLP

(57) ABSTRACT

A machine learning system includes multiple machine learning models. A target object, such as a file, is scanned for machine learning features. Context information of the target object, such as the type of the object and how the object was received in a computer, is employed to select a machine learning model among the multiple machine learning models. The machine learning model is also selected based on threat intelligence, such as census information of the target object. The selected machine learning model makes a prediction using machine learning features extracted from the target object. The target object is allowed or blocked depending on whether or not the prediction indicates that the target object is malicious.

13 Claims, 4 Drawing Sheets

| | Where | What | When | Who | Model |
|---|---|---|---|---|---|
| 411 | Where | What | When | Who | Model |
| | Web-download | PE-SFX | Census-prevalence < 50 Census-maturity < 7 days | Any | PE_Model-conservative |
| | Web-download | PE | Census-prevalence < 50 Census-maturity < 30 days | Any | PE_Model-aggressive |
| 412 | Word/PDF generated | PE | Census-prevalence < 100 Census-maturity < 90 days | Any | PE_Model-aggressive |
| | E-mail | PE | Census-prevalnace < 20 Census-maturity < 3 days | Any | PE_Model-email |
| | Manual-scan | PE | Census-prevalence < 10 Census-maturity < 3 days | enterprise user | PE_Model-scan-enterprise |
| | Manual-scan | PE | Census-prevalence < 100 Census-maturity < 30 days | consumer user | PE_Model-scan-consumer |
| | Manual-scan | JS-Script | Census-prevalence < 10 Census-maturity < 3 days | enterprise user | JS_Model-scan-enterprise |
| | Manual-scan | JS-Script | Census-prevalence < 100 Census-maturity < 30 days | consumer user | JS_Model-scan-consumer |

FIG. 4

CONTEXT-AWARE MACHINE LEARNING SYSTEM

BACKGROUND OF THE INVENTION

1. Field of the Invention

The present invention relates generally to computer security, and more particularly but not exclusively to methods and systems for detecting computer security threats.

2. Description of the Background Art

Computer security threats ("threats"), such as computer viruses and other malicious codes, may be detected using a variety of detection techniques. One detection technique is pattern matching, wherein objects (e.g., executable files) are scanned for signatures of known threats. Pattern matching has a low false positive rate, but is relatively ineffective against fast evolving threats. In particular, pattern matching requires signatures of particular threats. When a threat changes, the signature for that threat needs to be updated. Signature generation becomes very difficult as the number and mutation of threats increase.

Another detection technique is by machine learning. In machine learning, a model is trained using samples of known threats. Features found in the target object, i.e., object being evaluated for maliciousness, are input to the model, which gives a prediction of whether or not the target object is malicious, i.e., poses a threat. Although a model does not necessarily need signatures of known threats to make its prediction, the model is relatively inaccurate compared to pattern matching.

SUMMARY

In one embodiment, a machine learning system includes multiple machine learning models. A target object, such as a file, is scanned for machine learning features. Context information of the target object, such as the type of the object and how the object was received in a computer, is employed to select a machine learning model among the multiple machine learning models. The machine learning model may also be selected based on threat intelligence, such as census information of the target object. The selected machine learning model makes a prediction using machine learning features extracted from the target object. The target object is allowed or blocked depending on whether or not the prediction indicates that the target object is malicious.

These and other features of the present invention will be readily apparent to persons of ordinary skill in the art upon reading the entirety of this disclosure, which includes the accompanying drawings and claims.

DESCRIPTION OF THE DRAWINGS

FIG. 4 shows a model selection matrix for selecting a machine learning model among a plurality of machine learning models in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
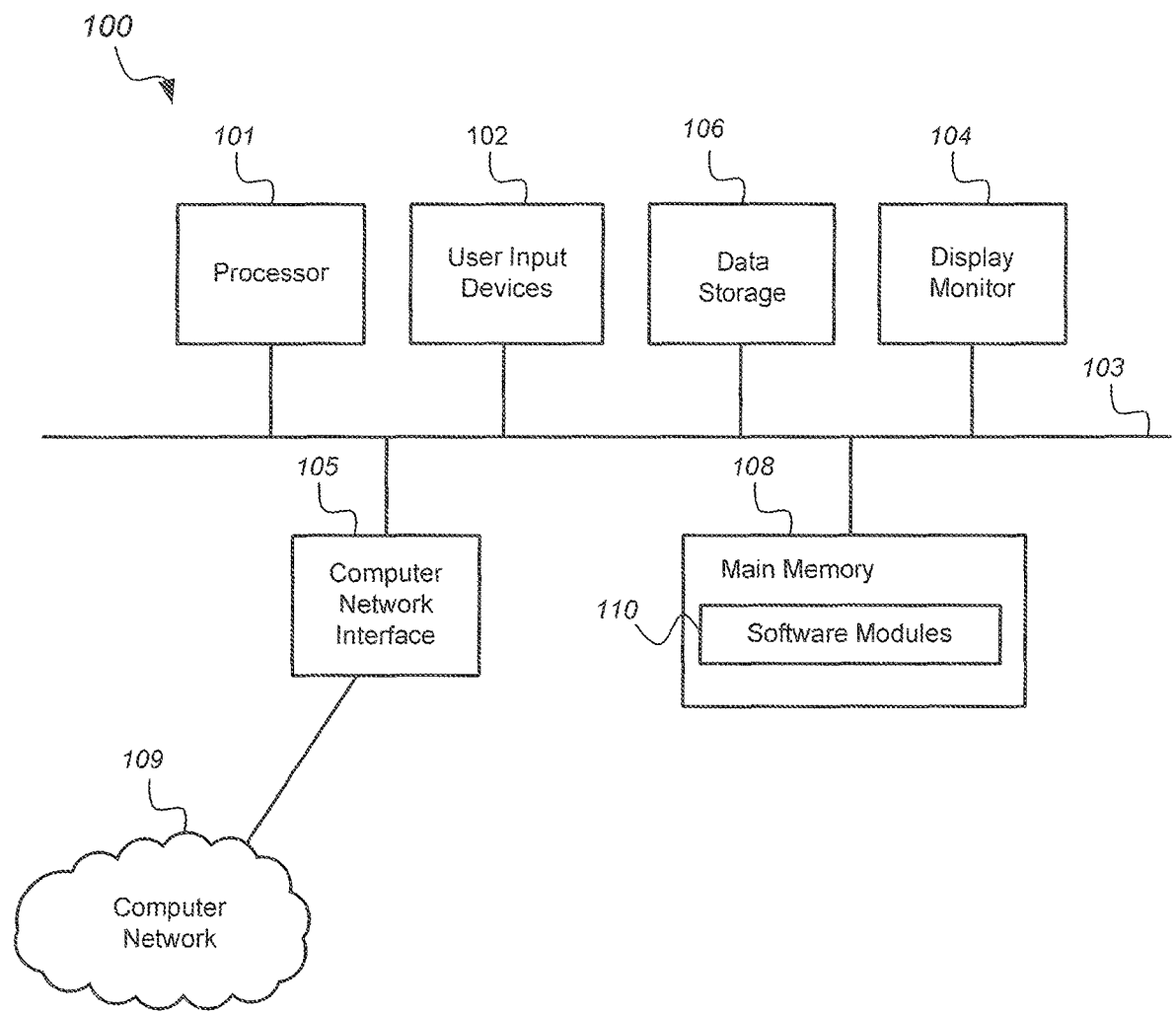
FIG. 1 shows a schematic diagram of a computer system in accordance with an embodiment of the present invention.

Referring now to FIG. 1, there is shown a schematic diagram of a computer system 100 in accordance with an embodiment of the present invention. The computer system 100 may be employed as any of the computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

When the computer system 100 is employed as a client computer in a client-server architecture, the software modules 110 may comprise a context-aware sensor and a feature extractor. When the computer system 100 is employed as a server computer in the aforementioned client-server architecture, the software modules 110 may comprise a model selection module and a plurality of machine learning models. When the computer system 100 is employed to detect computer security threats in a non-distributed architecture, the software modules 110 may comprise the context-aware sensor, the feature extractor, the model selection unit, and the plurality of machine learning models.

Figure 2:
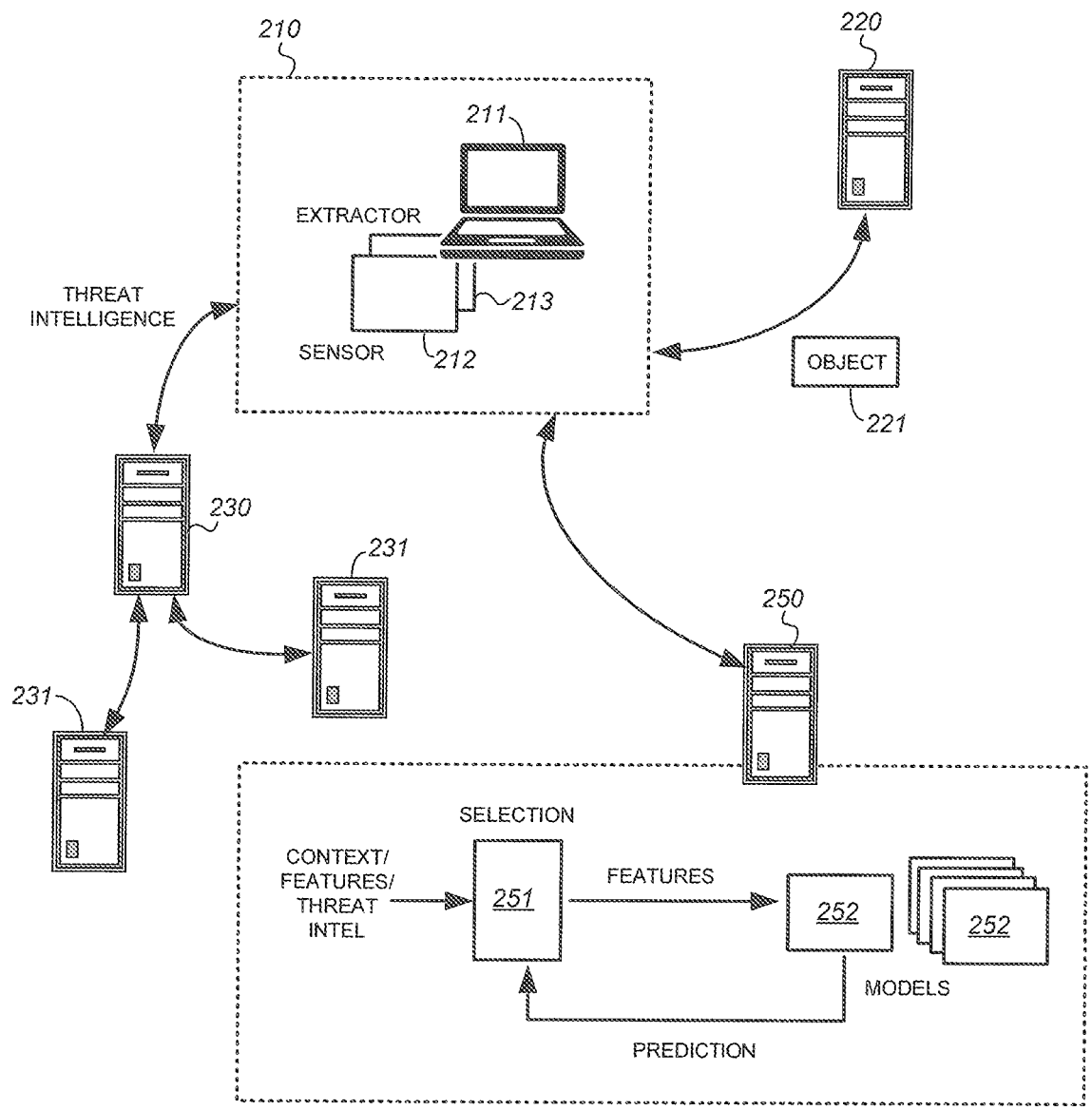
FIG. 2 shows a logical diagram of a machine learning system for determining whether an object is malicious in accordance with an embodiment of the present invention.

FIG. 2 shows a logical diagram of a machine learning system for determining whether an object is malicious in accordance with an embodiment of the present invention. The computers shown in FIG. 2 may communicate over the Internet and/or some other computer network.

In the example of FIG. 2, the machine learning system includes a computer 211 and a computer 250. The computers 211 and 250 are in a client-server architecture, where the computer 211 is a client and the computer 250 is a server. As can be appreciated, embodiments of the present invention are not limited to client-server architectures. In general, the functionality of the computers 211 and 250 may be performed by the same computer or distributed to three or more computers. For example, a computer may include a context-aware sensor 212, a feature extractor 213, a model selection module 251, and a plurality of machine learning models 252.

In the example of FIG. 2, the computer 211 runs a context-aware sensor 212 and a feature extractor 213, and the computer 250 runs a model selection module 251 and a plurality of machine learning models 252. The context-aware sensor 212, feature extractor 213, model selection module 251, and machine learning models 252 are implemented in software. As can be appreciated, these components may also be implemented in hardware (e.g., field programmable gate array, application-specific integrated circuits, programmable logic devices) and/or combination of hardware and software.

In the example of FIG. 2, a private computer network 210 (e.g., an enterprise network) includes a plurality of computers 211. Only one computer 211 is shown for clarity of illustration. Likewise, a machine learning system may include a plurality of computers 250 to serve a large number of computers 211, but only one computer 250 is shown in FIG. 2 for illustration purposes. A computer 211 and a computer 250 may communicate over the Internet. In other embodiments, the computers 211 and 250 are in the same private computer network. More specifically, the computer 250 may be on-premise, i.e., within the perimeter of the private computer network 210, along with the computer 211.

A computer 220 may be a web server or other type of computer from which the computer 211 may receive an object 221. An object 221 may be an executable file, a script, an email, a webpage, a document, or other data that may contain malicious code. In the example of FIG. 2, the object 221 is received from the computer 220 over a computer network, such as over the Internet or from within the private computer network 210. The object 221 may also be received from a computer-readable storage medium that is attached to the computer 211, such as a Universal Serial Bus (USB) drive, CD-ROM drive, etc.

In one embodiment, the context-aware sensor 212 is configured to detect when an object is received in the computer 211 by web download, by server message block (SMB), from a computer-readable storage medium, etc. In one embodiment, the context-aware sensor 212 is configured to record the context information of an object received in the computer 211, such as the origin of the object (i.e., source of the object; e.g., from the computer 220), arrival vector of the object (i.e., how the object arrived in the computer 211), the type of the object, when the object was received, and the user who received the object. The context-aware sensor 212 is configured to alert the feature extractor 213 to initiate scanning of the object in response to detecting reception of the object in the computer 211.

In one embodiment, the context-aware sensor 212 is configured to communicate with the computer 250 and other computers including one or more computers 230. In the example of FIG. 2, a computer 230 is configured to provide threat intelligence on particular objects. In one embodiment, the computer 230 works in conjunction with a plurality of computers 231 to generate census information of objects available on the Internet. A computer 231 may function as a honeypot, customer computer, etc. for detecting for presence of an object. A computer 231 may report to the computer 230 a number of times a particular object has been detected in the computer 231. This advantageously allows the computer 230 determine if an object has never been seen or rarely seen on the Internet. The computer 230 may keep census information on how many times the object has been detected within a period of time, and provide the census information to the context-aware sensor 212 as threat intelligence.

As can be appreciated, communications between the computer 211 and the computer 250 may also be performed by components other than the context-aware sensor 212 and the model selection module 251. For example, the feature extractor 213 (or some other component in the computer 211) may forward the extracted features, context information, and threat intelligence to the model selection module 251 or some other component in the computer 250.

In one embodiment, the feature extractor 213 is configured to extract machine learning features ("features") from a target object. In response to receiving an alert from the context-aware sensor 211, the feature extractor 213 scans the target object for features that were used to train the machine learning models 252. The context-aware sensor 211 forwards to the computer 250 the features extracted by the feature extraction 213 from the target object and the context information of the target object. When threat intelligence is available for the target object, the context-aware sensor 211 may also forward the threat intelligence to the computer 250.

In the computer 250, the model selection module 251 receives the extracted features, the context information, and threat intelligence of the target object. The model selection module 251 may be configured to select the best-fitting (i.e., most suitable) machine learning model among the plurality of machine learning models 252 according to the context information, extracted features, and threat intelligence of the target object.

The machine learning models 252 are different machine learning models, each one being trained and optimized for particular context information. For example a first machine learning model 252 may be primarily trained using portable executable (PE) files received by web download, whereas a second machine learning model 252 may be primarily trained using portable document format (PDF) files also received by web download. When the context information of a target file (i.e., file being evaluated for maliciousness) indicates that the target file is a PE file obtained by web download, the model selection module 251 will prioritize selection of the first machine learning model over the second machine learning model. In the same example, when the context information of the target file indicates that the target file is a PDF file obtained by web download, the model selection module 251 will select the second machine learning model 252, instead of the first machine learning model, to classify the target file. Generally speaking, the machine learning models 252 may be optimized for different origins (original source of the target object), arrival vector (how the target object arrived in the computer 211; e.g., by USB drive, download), object types, object reception dates, users who received the object, aggressiveness (e.g., aggressive or tuned to err on the side of positives (malicious code is detected); conservative or tuned to err on the side of negatives (no malicious code is detected)), threat intelligence, and so on to allow classification of a target object using the most relevant machine learning model 252. A machine learning model may be trained primarily or only with training samples that match particular objects to be classified by the machine learning model.

Continuing the example of FIG. 2, the model selection module 251 is configured to provide the extracted features to the selected machine learning model 252. The selected machine learning model 252 performs a classification using the extracted features to generate a prediction, which indicates whether or not the target object is malicious. The model selection module 251 returns the prediction to the computer 211. There, the context-aware sensor 212 receives the prediction. When the prediction indicates that the target object is malicious, the context-aware sensor 212 may block the object by putting the object in quarantine, preventing execution of the object, terminating the process of the object when the object is already executing, or performing other actions that will prevent the object from performing its malicious intentions.

Figure 3:
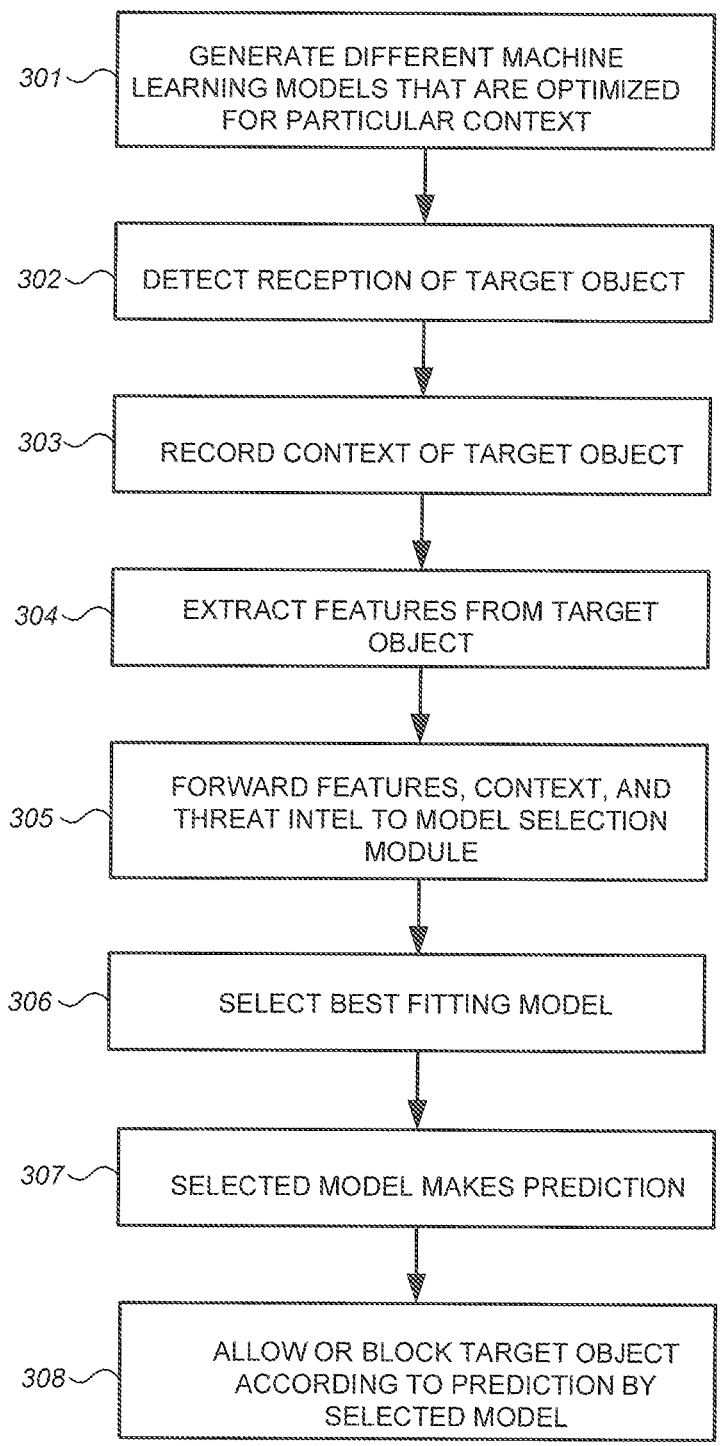
FIG. 3 shows a flow diagram of a computer-implemented method of determining whether an object is malicious in accordance with an embodiment of the present invention.

FIG. 3 shows a flow diagram of a computer-implemented method of determining whether an object is malicious in accordance with an embodiment of the present invention.

In the example of FIG. 3, a plurality of machine learning models 252 are generated (step 301).

Generally speaking, a feature is a characteristic of a particular object. For example, a spam email would have particular words (e.g., "VIAGRA") or phrases (e.g., "BUY NOW!") that are indicative of spam. As another example, a malicious PE file may have particular instructions, data structures, etc. that are indicative of the malicious PE file. To generate a machine learning model, training samples of objects that match the objects to be classified are obtained, features are extracted from the training samples, and the machine learning model is trained to perform classification using the features. A model may be trained using various machine learning approaches, including support vector machine (SVM), for example. When a target object is received, the target object is scanned for presence of the features used to train the machine learning model. The features used to train the machine learning model are identified in and extracted from the target object. The machine learning model classifies the object based on the extracted features of the object. The result of the classification is in the form of a prediction on how close the object is to the samples used to train the machine learning model. For example, a machine learning model may be trained using features of samples of known malicious PE files obtained by web download. This allows the machine learning model to make a prediction on whether a PE file obtained by web download is malicious based on features present in the PE file.

From the above discussion, it can be appreciated that the effectiveness of a machine learning model depends on the relevancy of the training samples to the object being classified. In one embodiment, the machine learning models are optimized for particular context information. Rather than using a single machine learning model for all objects regardless of context, embodiments of the present invention include a plurality of machine learning models to better fit the object being classified. A machine learning model is selected to make a prediction on a target object based at least on the target object's context information.

More particularly, in step 301, multiple machine learning models 252 are generated, with each machine learning model 252 being optimized for particular context, such as for a particular type of file or application that arrived in the computer 211 a particular way. As an example, a machine learning model 252 may be optimized for PE files that are downloaded from web servers on the Internet. In that example, only or primarily the most-relevant training data for web-downloaded files may be used in training the machine learning model 252. This advantageously eliminates or reduces noise and side effects (which may result in false predictions) caused by non-relevant training data.

Different machine learning models 252, each with different levels of aggressiveness may also be created. For example, an aggressive web download machine learning model 252 may be generated for rarely-seen files that have been downloaded from non-trusted web servers. In that example, "non-trusted website" is context information of a target file and "new" and "rarely seen" are metadata that constitute threat intelligence received for the target file. The aggressive web download machine learning model 252 may be used to classify a rarely-seen or new file downloaded from a non-trusted web server, whereas a more conservative machine learning model 252 may be used to classify a rarely-seen or new file downloaded from a trusted web server. In general, different machine learning models 252 that map to different aggressiveness may be generated and selected based on context information and/or threat intelligence.

Continuing the example of FIG. 3, the context-aware sensor 212 detects reception of a target object in the computer 211 (step 302). For example, the context-aware sensor 212 may receive notification from the operating system, driver, or other component that a file is being stored in a data storage device, a new application is being launched, or a web page is being received in the computer 211. The context-aware sensor 212 records context information of the target object (step 303). For example, the context-aware sensor 212 may record the origin and arrival vector of the target object.

The context-aware sensor 212 invokes the feature extractor 213, which scans the target object for features that were used in the training of the machine learning models 252. The feature extractor 213 identifies and extracts the features from the target object (step 304).

The context-aware sensor 212 forwards the features extracted from the target object, context information of the target object, and threat intelligence on the target object (if any) to the model selection module 251 (step 305).

The model selection module 251 selects a machine learning model 252 based on the features extracted from the target object, context information of the target object, and/or threat intelligence on the target object (step 306). In one embodiment, the model selection module 251 selects the best fitting machine learning model 252 among the plurality of machine learning models 252 by consulting a model selection matrix, as now explained with reference to FIG. 4.

FIG. 4 shows an example model selection matrix 400 for selecting a machine learning model 252 among a plurality of machine learning models 252 in accordance with an embodiment of the present invention. In the example of FIG. 4, the model selection matrix 400 includes columns 401-404 for selecting a particular machine learning model 252 indicated in the column 405. As can be appreciated, the model selection matrix 400 is provided for illustration purposes only. In general, a model selection matrix may have more or fewer columns/rows.

In the example of FIG. 4, the column 401 indicates the origin or arrival vector ("Where") of the target object. More particularly, the column 401 may indicate the origin of the target object and/or how the target arrived in the computer 211. In the example of FIG. 4, the target object may be received over the Internet ("Web-download"), locally discovered by manually scanning ("Manual-scan") the data storage devices of the computer 211, received from a computer-readable storage medium attached to the computer 211, etc.

In the example of FIG. 4, the column 402 indicates the type of the target object ("What"), such as whether the target object is a self-extracting PE file ("PE-SFX"), a PE file, a Java Script ("JS-Script"), etc. The type of the target object reflects the features extracted from the target object.

In the example of FIG. 4, the column 403 indicates threat intelligence on the target object. As a particular example, census information ("When") for particular files may be gathered and maintained by the computer 230. The computer 230 may store the number of times ("Census-prevalence") a file has been detected in various computers 231 on the Internet within a census period ("Census-maturity"). More specifically, in the example of FIG. 4, a machine learning model 252 for a target file may be selected based on the census information of the target file.

In the example of FIG. 4, the column 404 indicates the user ("Who") who received the target object. For example, the column 404 may indicate any user, an enterprise user, a consumer user, etc. This advantageously allows more aggressive machine learning models 252 to be used in classifying target objects received in an enterprise environment. Because consumer users are more sensitive to false positives compared to enterprise users, more conservative machine learning models may be used to classify target objects received by a consumer user.

In the example of FIG. 4, the column 405 indicates the best-fitting machine learning model 252 based on context information, extracted features, and/or threat intelligence indicated in the columns 401-404. The columns 401-404 indicate the context information and/or threat intelligence assigned to the machine learning model 252 indicated in the column 405.

For example, the model selection module 251 may select a conservative machine learning model 252 ("PE_Model-conservative") to classify a PE-SFX file that was received by web download, detected less than 50 times within a seven day period, and received by any user (see row 411). As another example, the model selection module 251 may select a machine learning model 252 trained on PE fails received by email ("PE_Model-email") to classify a PE file received by email, detected less than 20 times within a three day period, and received by any user (see row 412).

Continuing the example of FIG. 3, the model selection module 251 provides the extracted features of the target object to the selected machine learning model 252, which makes a prediction using the extracted features (step 307). The model selection module 251 receives the prediction from the selected machine learning model 252, and provides the prediction to the context-aware sensor 212. The context-aware sensor 212 allows or blocks the target object depending on the prediction (step 308). For example, the context-aware sensor 212 may allow the target object to execute when the prediction indicates that the target object is not malicious. Otherwise, when the prediction indicates that the target object is malicious, the context-aware sensor 212 may block the target object from executing.

Machine learning systems for detecting malicious objects have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method comprising:
training a plurality of machine learning models with different sets of training samples;
assigning context information to each of the plurality of machine learning models;
recording context information of a target object;
scanning the target object for machine learning features used to train the plurality of machine learning models;
extracting the machine learning features from the target object;
selecting a first machine learning model from among the plurality of machine learning models as a most suitable machine learning model to classify the target object based on context information assigned to the first machine learning model relative to the context information of the target object;
making a prediction, by the first machine learning model, using the machine learning features; and
blocking or allowing the target object depending on the prediction made by the first machine learning model.

2. The method of claim 1, wherein selecting the first machine learning model comprises:
identifying the first machine learning model as having been trained using training samples of objects that have a same type as the target object.

3. The method of claim 2, wherein the target object is a file and the first machine learning model has been trained primarily or only with training samples of files that have a same type as the file.

4. The method of claim 1, wherein the context information of the target object indicates a manner how the target object was received in a computer.

5. The method of claim 4, wherein the context information of the target object indicates that the target object was received in the computer by email.

6. The method of claim 4, wherein the context information of the target object indicates that the target object was received in the computer by web download.

7. A system comprising:
a processor; and
a memory storing instructions that when executed by the processor cause the system to perform the steps of:
assigning context information to each of a plurality of machine learning models;
receiving a target object over a computer network;
recording context information of the target object;
scanning the target object for machine learning features used to train the plurality of machine learning models;
extracting the machine learning features from the target object;
selecting a machine learning model among the plurality of machine learning models as a most suitable machine learning model to classify the target object based on context information assigned to the machine learning model relative to the context information of the target object;
making a prediction, by the machine learning model, using the machine learning features; and
blocking or allowing the target object depending on the prediction made by the machine learning model.

8. The system of claim 7, wherein the machine learning model has been trained using training samples of objects that have a same type as the target object.

9. The system of claim 8, wherein the target object is a file and the machine learning model has been trained primarily or only with training samples of files that have a same type as the file.

10. A method comprising:
receiving a target object in a first computer;
in the first computer, extracting machine learning features from the target object, recording context information of the target object, forwarding the context information of the target object and the machine learning features to a second computer, receiving a prediction from the second computer, and blocking the target object when the prediction indicates that the target object is malicious; and
in the second computer, receiving the context information of the target object and the machine learning features, selecting a machine learning model from among a plurality of machine learning models as a most suitable machine learning model to classify the target object based on context information assigned to the machine learning model relative to the context information of the target object, using the machine learning model to make the prediction as to whether the target object is malicious, and forwarding the prediction to the first computer.

11. The method of claim 10, wherein the target object is a file and context information of the file matches the context information assigned to the machine learning model.

12. The method of claim 10, wherein the target object is a portable executable file (PE) file received in the first computer by email and the context information assigned to the machine learning model is a PE file received by email.

13. The method of claim 10, wherein selecting the machine learning model comprises:

in the second computer, consulting a model selection matrix that indicates the plurality of machine learning models and context information assigned to each of the plurality of machine learning models.

\* \* \* \* \*